United States Patent

[11] 3,557,322

[72] Inventor Stephen W. Walden
Morral Township, Shelby, Ind.
[21] Appl. No. 788,174
[22] Filed Dec. 31, 1968
[45] Patented Jan. 19, 1971
[73] Assignee Bell Telephone Laboratories, Incorporated
Murray Hill, N.J.
a corporation of New York

[54] WALL SUPPORT WITH LOCKING FEATURE FOR A TELEPHONE HANDSET
10 Claims, 6 Drawing Figs.

[52] U.S. Cl. .......... 179/146, 179/100
[51] Int. Cl. .......... H04m 1/06
[50] Field of Search .......... 179/100, 146

*Primary Examiner*—William C. Cooper
*Attorneys*—R. J. Guenther and Edwin B. Cave

ABSTRACT: The support has a recess that accommodates the earpiece of the handset, the recess being bounded by a locking wall at the upper end thereof, a locking wall at each side, and a ledge at the lower end. A hookswitch plunger protrudes through the ledge, and the upper surface of the plunger together with the upper locking wall of the recess interact with the earpiece to secure the handset to the support when the lower end of the handset is tilted out from the support. In addition, the two side locking walls of the recess interact with the earpiece to secure the handset to the support when the lower end of the handset is tilted parallel to the support.

INVENTOR
S. W. WALDEN
BY
ATTORNEY

WALL SUPPORT WITH LOCKING FEATURE FOR A TELEPHONE HANDSET

FIELD OF THE INVENTION

This invention relates to the field of telephone station apparatus and within that field to wall mounted supports for telephone handsets.

DESCRIPTION OF THE PRIOR ART

Recently telephone sets have been introduced in which the dial is incorporated in the handset in order to enable the user to dial from any position to which the handset cord will extend and with the dial oriented in whatever position is most comfortable. Since the dial is located intermediate the earpiece and the mouthpiece, the conventional shape of the handset, consisting of two somewhat spherical protuberances located on either end of a narrow handle, has had to be changed. The new configuration has a somewhat shoelike appearance with the earpiece extending forward from the face of the handset much in the same manner as the heel extends forward from the sole, but with there being no significant reduction in the width of the handset between the earpiece and the mouthpiece.

As a result of the new configuration, the U-type hanger that is commonly employed to support the conventional handset on a vertical surface, such as shown in U.S. Pat. No. 2,511,622 issued to S. T. Curran et al. on June 13, 1950, is no longer suitable and new arrangements have had to be devised. One such arrangement for supporting the new handset on a vertical surface is shown in U.S. Pat. No. 2,949,509 issued to W. E. Whidden on Aug. 16, 1960 and consists of providing the base of the wall set with a ledge on which the earpiece rests. Another arrangement for supporting the handset is disclosed in U.S. Pat. No. 3,073,911 issued to C. F. Mattke et al. on Jan. 15, 1963 and consists of providing the base with a hook that extends into a cavity in the handset.

Neither of these arrangements provides the same degree of stability as is achieved between the conventional handset and the U-type hanger. Thus with both of these arrangements when the lower end of the handset is tilted away from or parallel to the base, as by pulling the handset cord out from the wall or sideways along the wall, the handset is dislodged from the base. Tilting the conventional handset in this manner, on the other hand, does not dislodge it from the U-type hanger.

It is to be recognized however that the desirability of being able to dislodge a handset from a wall support by pulling on the cord is affected by whether or not the dial is incorporated in the handset. There have been cases reported where a subscriber has been injured or has had a stroke and has obtained help by pulling a desk set to the floor by means of the cord. If a conventional wall set rather than a desk set were involved, no assistance could be obtained by pulling the handset from the wall support since the dial would still be inaccessible. Consequently there is no benefit to being able to dislodge the conventional handset by pulling on the cord. If, conversely, a dial-in handset wall telephone were involved then the same result as with the desk set could be achieved if the handset could be dislodged by pulling on the cord. It is therefore desirable to be able to intentionally dislodge the new handset from a wall mounted base by pulling on the handset cord. It is also desirable to prevent inadvertent dislodgement of the handset by this same method.

SUMMARY OF THE INVENTION

A wall support for the new handset is herein disclosed that has these features. As indicated above, the handset has a protuberant earpiece and when viewed in profile, the upper surface of the earpiece extends at an obtuse angle to the face of the earpiece while the lower surface extends at an acute angle to the face. In addition, the sides of the earpiece are generally planar.

The wall support comprises a housing having a recess therein at the upper end thereof for accommodating the earpiece of the handset. The recess is bounded by a ledge at its lower end, a locking wall at its upper end, an inclined back wall at the rear, and a locking wall on each side. A hookswitch plunger protrudes through an opening in the ledge and is movable between an extended position and a depressed position, the earpiece of the handset engaging the plunger and moving it to the depressed position when the handset is positioned on the support. The upper surface of the plunger extends at about the same angle with respect to the backwall of the recess, that the bottom surface of the earpiece extends with respect to the face of the earpiece, and when the plunger is in the depressed position the upper surface thereof is spaced from the upper locking wall about the same distance as between the upper and lower surfaces of the earpiece. As a result, the earpiece is captured between the upper surface of the plunger and the upper locking wall when the end of the handset opposite to the earpiece is tilted away from the support. In addition, the side locking walls extend nearly perpendicular to the backwall and are spaced slightly farther than the sides of the earpiece whereby the earpiece is captured between the side locking walls when the end of the handset opposite to the earpiece is tilted sideways parallel to the support.

In both instances the capturing serves to keep the handset from being dislodged from the support if the handset cord is played with or a casual force is exerted thereon. However, if a significant force is exerted on the handset cord and the force acts to tilt the lower end of the handset out from the support and/or sideways parallel to the support, the handset does come free from the support. This arrangement does not in any way impede the normal use of the handset since the aforementioned capturing only occurs when the handset is pivoted about the earpiece whereas in the normal removal of the handset, the earpiece is moved away from the support along with the rest of the handset.

DETAILED DESCRIPTION OF THE INVENTION

Figure 1:
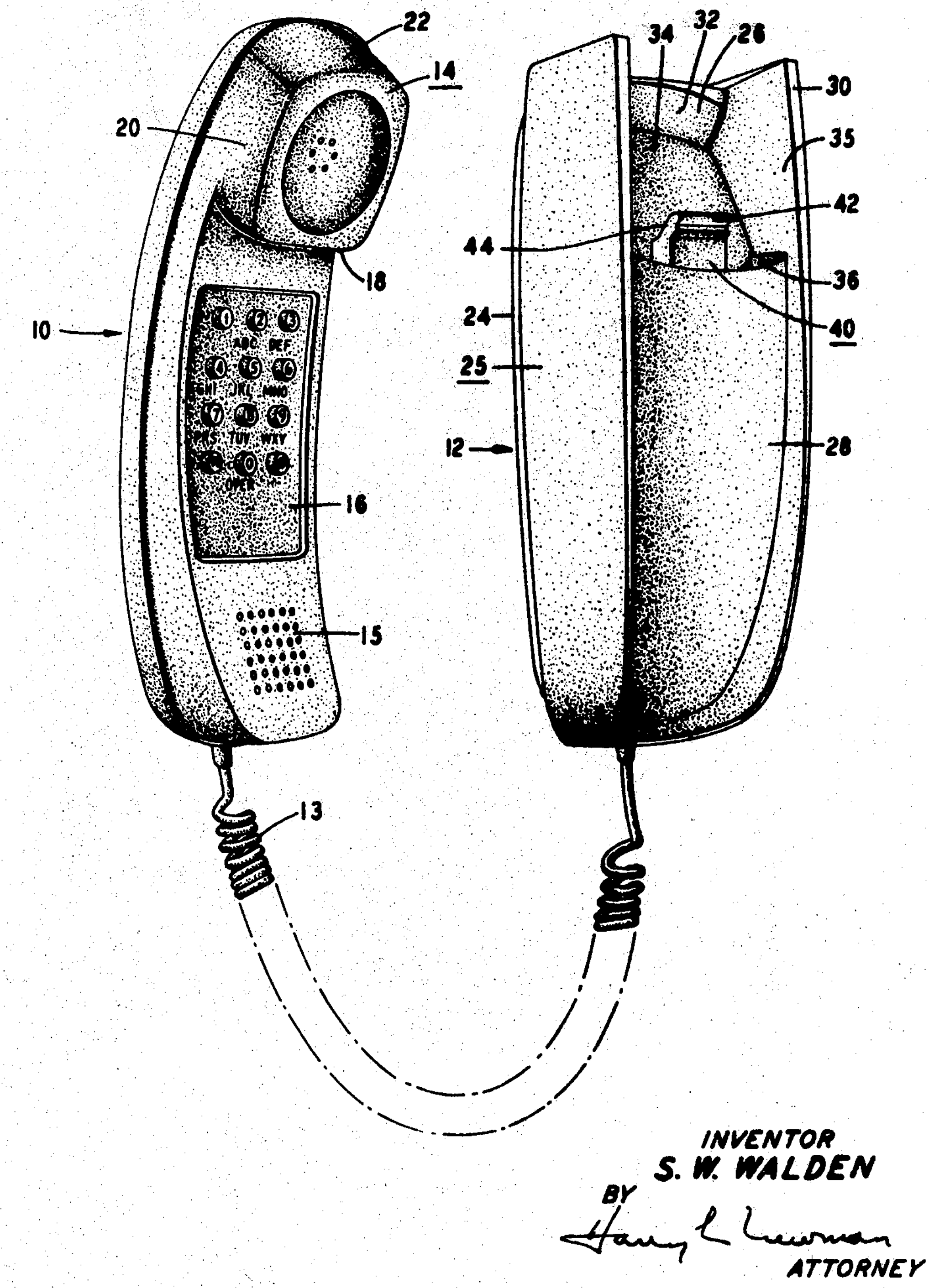
FIG. 1 is a perspective view of a dial-in handset telephone showing the handset removed from the wall mounted support of this invention.
Figure 2:
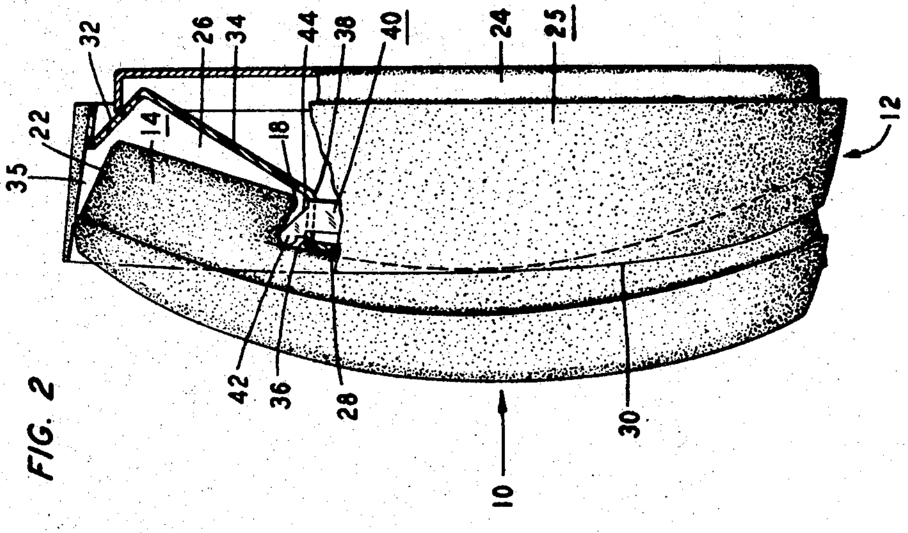
FIG. 2 is a side view partially in section showing the handset resting in its normal position on the support.

Referring to FIGS. 1 and 2 of the drawing, the dial-in handset wall telephone set consists of a handset 10 and a support 12 electrically interconnected by a handset cord 13. The face of the handset 10 has a protuberant earpiece 14 at one end thereof, a flush mouthpiece 15 at the other end thereof, and a dial 16 in the middle. In the embodiment disclosed, the earpiece 14 is quadrangular in shape and it has a planar lower surface 18 extends at an acute angle to the face of the earpiece while the upper surface 22 extends at an obtuse angle to the face.

The support 12 comprises a base plate 24 on which is mounted a housing 25 having a recess 26 situated above a front surface 28. The sides and bottom of the housing 25 extend forward of the front surface 28 to provide a U-shaped ridge 30, shown most clearly in FIG. 1, and when the handset 10 is positioned on the support, as shown in FIG. 2, the face of the handset is contained within the ridge, the earpiece 14 extending into the recess 26.

The recess 26 is bounded by a locking wall 32 at upper end, an inclined backwall 34 at the rear, a locking wall 35 at each side, and a ledge 36 at the lower end. The upper locking wall 32 is convexly curvilinear in shape and it generally conforms to the shape of the upper surface 22 of the earpiece 14. In addition, the upper locking wall 32 extends at an obtuse angle to the backwall 34, and this angle is about the same as the angle at which the upper surface 22 of the earpiece 14 extends to the earpiece face. The term "about the same angle" as used herein is intended to mean within 20° of one another. The backwall 34 is inclined so that the upper end thereof is farther to the rear than the lower end, and side locking walls 35 extend nearly perpendicular to the plane of the backwall, the sidewalls being slightly closer together at the rear than they are at the front (See FIG. 6).

The ledge 36 has an opening 38 therein and a hookswitch plunger 40 is movably mounted in the opening. The plunger 40 is biased upward by the hookswitch (not shown) so that when the handset 10 is removed from the support 12, the plunger moves to an extended position shown in FIG. 1. But when the handset 10 is returned to the support 12, the lower surface 18 of the earpiece 14 engages the plunger 40, and the weight of the handset overcomes the biasing force of the hookswitch to move the plunger downward to a depressed position, shown in FIG. 2, wherein a step in the plunger engages the ledge 36. Actuation of the hookswitch occurs as the plunger moves between the extended and depressed positions.

The plunger 40 has a rounded lip 42 that merges into a downwardly inclined upper surface 44, and the upper surface is planar so that it conforms to the shape of the lower surface 18 of the earpiece 14. In addition, the upper surface 44 extends at an acute angle to the backwall 34 and this angle is about the same as the angle that the lower surface 18 of the earpiece 14 makes with the face of the earpiece. Furthermore, when the plunger 40 is in the depressed position, the distance between the upper surface 44 and the upper locking wall 32 is a little greater than the distance between the lower surface 18 and the upper surface 22 of the earpiece 14.

As a result of these relationships, when the handset 10 is positioned on the base 12, the weight of the handset causes the lower surface 18 of the earpiece 14 to slide along the lip 42 of the plunger until the lip engages the portion of the handset immediately below the earpiece as shown in FIG. 2. This then is the normal rest position of the handset 10.

Figure 3:
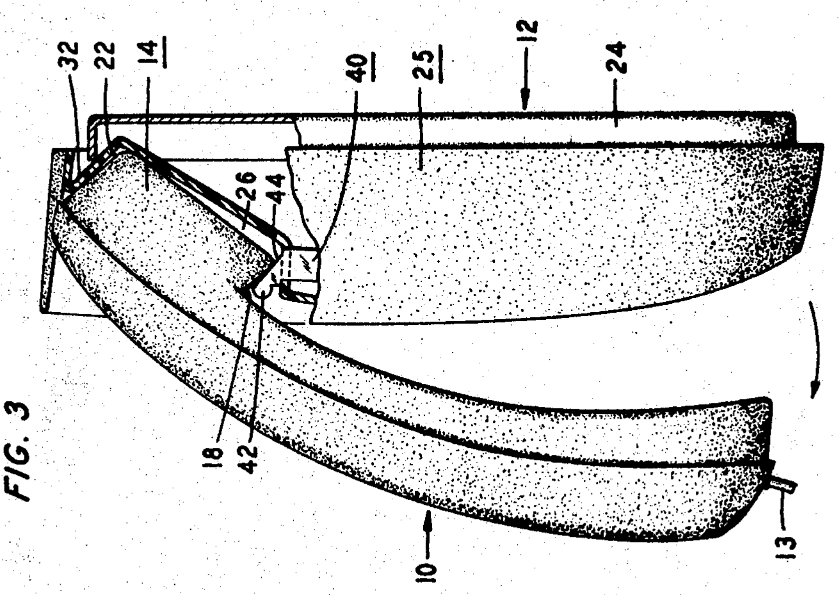
FIG. 3 is a side view partially in section with the lower end of the handset tilted out from the support and showing the interaction of the earpiece of the handset with the upper surface of the switchhook plunger and the upper locking wall of the support.

When the lower end of the handset 10 is tilted away from the base 12 as shown in FIG. 3, the handset rotates about the lip 42 of the plunger 40 until the lower surface 18 of the earpiece 14 lies on the upper surface 44 of the plunger. Thereafter continued tilting of the lower end of the handset 10 results in the handset rotating about the rounded corner between the lower surface 18 and the face of the earpiece 14, and this rotation about the rounded corner continues until the upper surface 22 of the earpiece engages the upper locking wall 32 of the recess 26.

At this point the earpiece 14 is captured in the recess 26 and further outward rotation of the handset 10 is resisted. The reason is that further rotation of the handset 10 occurs about the point of contact between the upper surface 22 of the earpiece 14 and the upper locking wall 32 of the recess 26. Thus to free the handset 10 from the support 12, it is necessary to move the rounded corner between the lower surface 18 and the face of the earpiece 14 past the lip 42 of the plunger 40. Since the distance between the point of rotation and the rounded corner is greater than the distance between the point of rotation and the lip 42 of the plunger 40, a wedging action occurs.

As a result, if a casual outward force is exerted on the handset cord 13, the handset 10 does not come free from the support, and the resistance encountered acts to discourage further pulling on the cord. However, if a significant amount of force is exerted on the handset cord 13, and by this is meant a force of about 15 pounds, the upper locking wall 32 is caused to flex to permit the lower rounded corner of the earpiece 14 to move past the lip 42 of the plunger 40, and the handset 10 is dislodged from the support 12.

Figures 4, 5, 6:
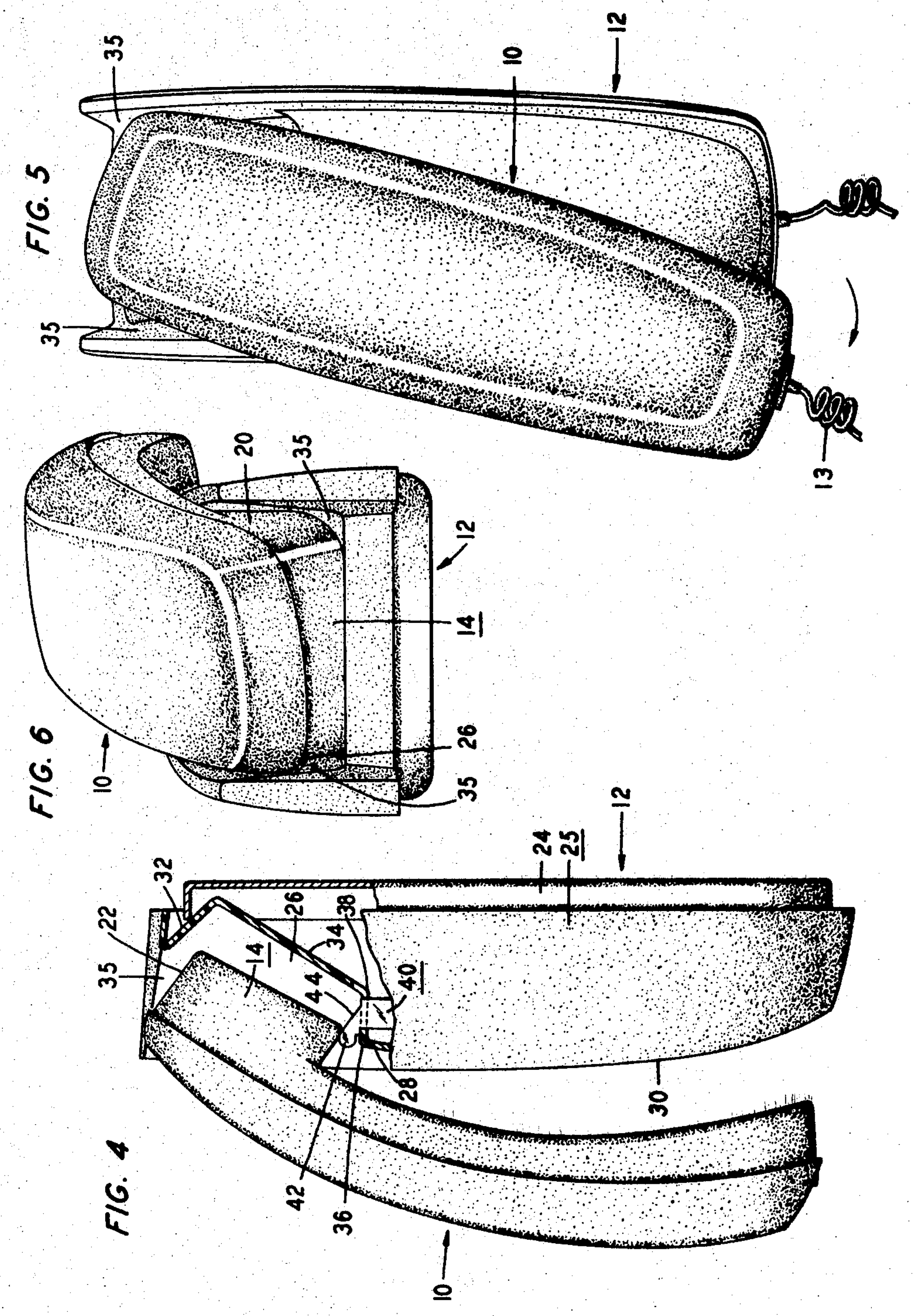
FIG. 4 is a side view partially in section showing the lack of interference of the switchhook plunger and the upper locking wall with the earpiece when the handset is removed from the support in the normal manner.
FIG. 5 is a front view showing the lower end of the handset tilted sideways parallel to the support.
FIG. 6 is an upper end view showing the interaction of the earpiece and the upper end of the handset with the side locking walls of the support when the lower end of the handset is tilted sideways.

As shown in FIG. 4, the foregoing arrangement does not interfere with the normal removal of the handset 10 from the support 12 inasmuch as during normal removal the handset as a whole is generally moved outward from the support. The foregoing locking action only occurs when the lower end is tilted out from the support 12 without simultaneous movement of the upper end away from the support.

Referring now to FIGS. 5 and 6, when the lower end of the handset 10 is tilted parallel to the support 12, the handset rotates freely until one side at the upper end of the handset engages one of the side locking walls 35 and the opposite side 20 of the earpiece 14 engages the other side locking wall. At this point further lateral tilting of the handset 10 is resisted because of the quadrangular shape of the earpiece 14. That is, the distance between two diagonal corners of the earpiece is greater than the distance between the sides 20, and since the distance between the side locking walls 35 is only slightly greater than the distance between the sides 20 of the earpiece 14, the side locking walls impede further rotation of the handset once the foregoing engagement has taken place.

Thus as in the case of the outward tilting of the lower end of the handset 10, if a casual lateral force is exerted on the handset cord 13, the handset does not come free from the support 12, and the resistance encountered acts to discourage further pulling on the cord. However, because the side locking walls 35 have a slight inclination, a portion of the force acts to move the earpiece 14 out from the recess 26, and consequently, if a significant force is exerted on the handset cord 13, the handset 10 is dislodged from the support 12.

Finally, as seen most clearly in FIG. 2, one additional restraint on the handset 10 that is provided by the support 12 is by way of the ridge 30. Since a significant portion of the handset 10 is within the ridge 30, the ridge acts to prevent the handset from being accidentally brushed off from the support 12.

Although but one embodiment of the invention has been shown and described, it will be understood that it is but illustrative and that various modifications may be made therein without departing from the scope and spirit of this invention as defined in the appended claims.

I claim:

1. A wall support for a telephone handset having a protuberant earpiece that includes a face that is placed against the user's ear and an upper and lower surface, the telephone support comprising:
   - a housing having a recess therein, the recess including an inclined backwall, the upper end of which is farther to the rear than the lower end;
   - a first locking surface at the upper end of the recess; and
   - a second locking surface at the lower end of the recess, the second locking surface extending at about the same angle with respect to the backwall of the recess that the lower surface of the earpiece extends with respect to the face of the earpiece, and the second locking surface being spaced from the first locking surface a slightly greater distance than the distance between the upper and lower surfaces of the earpiece.

2. A wall support for a telephone handset having a protuberant earpiece that includes an upper and lower surface and a face extending therebetween, the telephone support comprising:
   - a housing having a recess therein at the upper end thereof, the recess being bounded at its lower end by a ledge and at its upper end by an upper locking wall, and the recess having an inclined backwall extending between the ledge and the upper locking wall, the upper end of the backwall being farther to the rear than the lower end; and a plunger protruding through an opening in the ledge, the plunger being movable between an extended position and a depressed position, the earpiece of the handset engaging the plunger and moving it to the depressed position when the handset is positioned on the support, the plunger having an upper surface that extends at about the same angle with respect to the backwall of the recess that the lower surface of the earpiece extends with respect to the face of the earpiece, and the upper surface of the plunger when the plunger is in a depressed position being spaced from the upper locking wall of the recess a slightly greater distance than the distance between the upper and lower surfaces of the earpiece.

3. A telephone support as in claim 2 wherein the angle at which the upper locking wall extends with respect to the backwall is about the same as the angle at which the upper surface of the earpiece extends with respect to the face of the earpiece.

4. A telephone support as in claim 2 wherein the upper surface of the plunger conforms in shape to the lower surface of the earpiece.

5. A telephone support as in claim 2 wherein the upper locking wall conforms in shape to the upper surface of the earpiece.

6. A wall support for a telephone handset having a protuberant earpiece that includes an upper and lower surface, a pair of planar side surfaces, and a face, the telephone support comprising:

a housing having a recess therein at the upper end thereof, the recess being bounded by a ledge at its lower end, a locking wall at its upper end, a locking wall at each side, and an inclined backwall at the rear, the upper end of the backwall being farther to the rear than the lower end, the side locking walls extending nearly perpendicular to the backwall and being spaced slightly farther apart than the side surfaces of the earpiece; and a plunger protruding through an opening in the ledge, the plunger being movable between an extended position and a depressed condition, the earpiece of the handset engaging the plunger and moving it to the depressed condition when the handset is positioned on the support, the plunger having an upper surface that extends at about the same angle with respect to the backwall of the recess that the lower surface of the earpiece extends with respect to the face of the earpiece, and the upper surface of the plunger when the plunger is in a depressed position being spaced from the upper locking wall of the recess a slightly greater distance than the distance between the upper and lower surfaces of the earpiece.

7. A telephone support as in claim 6 wherein the angle at which the upper locking wall extends with respect to the backwall is about the same as the angle at which the upper surface of the earpiece extends with respect to the face of the earpiece.

8. A telephone support as in claim 6 wherein the upper surface of the plunger conforms in shape to the lower surface of the earpiece.

9. A telephone support as in claim 8 wherein the upper locking wall conforms in shape to the upper surface of the earpiece.

10. A telephone support as in claim 9 further including a ridge that circumscribes three sides of the handset when it is positioned on the support.